(12) United States Patent
Kim et al.

(10) Patent No.: US 8,902,103 B2
(45) Date of Patent: Dec. 2, 2014

(54) RADAR APPARATUS SUPPORTING SHORT AND LONG RANGE RADAR OPERATION

(75) Inventors: Cheon Soo Kim, Daejeon (KR); Pil Jae Park, Daejeon (KR); Min Park, Daejeon (KR); Kyung Hwan Park, Daejeon (KR); Dong-Young Kim, Daejeon (KR); Jeong-Geun Kim, Seoul (KR); Bon Tae Koo, Daejeon (KR); Hyun Kyu Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 250 days.

(21) Appl. No.: 13/421,223

(22) Filed: Mar. 15, 2012

(65) Prior Publication Data

US 2012/0235857 A1    Sep. 20, 2012

(30) Foreign Application Priority Data

Mar. 16, 2011  (KR) .................. 10-2011-0023592
Mar. 7, 2012   (KR) .................. 10-2012-0023430

(51) Int. Cl.
*G01S 13/00* (2006.01)
*G01S 13/08* (2006.01)
*G01S 13/34* (2006.01)
*G01S 13/93* (2006.01)
G01S 13/02 (2006.01)
G01S 7/35 (2006.01)

(52) U.S. Cl.
CPC ............ *G01S 13/345* (2013.01); *G01S 13/931* (2013.01); *G01S 2013/0254* (2013.01); *G01S 2007/358* (2013.01)
USPC ............. 342/70; 342/118; 342/128; 342/131; 342/132; 342/134

(58) Field of Classification Search
USPC ............................. 342/70–72, 118, 128–144
See application file for complete search history.

(56) References Cited

U.S. PATENT DOCUMENTS

| | | | | |
|---|---|---|---|---|
| 3,344,426 A | * | 9/1967 | Long | 342/157 |
| 3,451,059 A | * | 6/1969 | Page | 342/132 |
| 3,728,724 A | * | 4/1973 | Alpers | 342/83 |
| 3,945,011 A | * | 3/1976 | Glasgow | 342/132 |
| 4,136,341 A | * | 1/1979 | Mulder et al. | 342/160 |

(Continued)

FOREIGN PATENT DOCUMENTS

| | | |
|---|---|---|
| CN | 101076741 A | 11/2007 |
| KR | 10-0951529 B1 | 4/2010 |

OTHER PUBLICATIONS

Toshiya Mitomo et al., "A 77GHz 90 nm CMOS Transceiver for FMCW Radar Applications", IEEE Journal of Solid-State Circuits, vol. 45, No. 4, pp. 928-937, Apr. 2010.

(Continued)

*Primary Examiner* — Peter Bythrow
(74) *Attorney, Agent, or Firm* — Rabin & Berdo, P.C.

(57) ABSTRACT

Disclosed is a radar apparatus supporting short range and long range radar operations, wherein a plurality of short range transmitting chirp signals and a plurality of long range transmitting chirp signals are generated by a predetermined modulation scheme and is transmitted to an object through at least one transmitting array antenna and signals reflected from the object is received through at least one receiving array antenna, and the plurality of long range transmitting chirp signals have transmission power larger than that for the plurality of short range transmitting chirp signals.

14 Claims, 4 Drawing Sheets

(56) References Cited

U.S. PATENT DOCUMENTS

| | | | |
|---|---|---|---|
| 4,404,562 A * | 9/1983 | Kretschmer et al. | 342/194 |
| 4,490,720 A * | 12/1984 | Kuntman | 342/195 |
| 4,524,361 A * | 6/1985 | Teulings | 342/201 |
| 4,573,050 A * | 2/1986 | Waters | 342/157 |
| 4,983,979 A * | 1/1991 | McKenzie | 342/204 |
| 5,128,681 A * | 7/1992 | McGroary et al. | 342/132 |
| 5,140,332 A * | 8/1992 | Martin et al. | 342/202 |
| 5,652,589 A * | 7/1997 | Ono et al. | 342/70 |
| 5,734,345 A * | 3/1998 | Chen et al. | 342/74 |
| 5,959,578 A * | 9/1999 | Kreutel, Jr. | 342/373 |
| 6,047,244 A * | 4/2000 | Rud, Jr. | 702/98 |
| 6,507,311 B2 | 1/2003 | Sauer | |
| 6,509,863 B2 * | 1/2003 | Zoratti et al. | 342/70 |
| 6,580,385 B1 * | 6/2003 | Winner et al. | 342/70 |
| 6,606,052 B1 | 8/2003 | Miyahara | |
| 6,646,589 B2 * | 11/2003 | Natsume | 342/70 |
| 6,750,810 B2 * | 6/2004 | Shinoda et al. | 342/149 |
| 6,816,084 B2 * | 11/2004 | Stein | 340/903 |
| 6,844,842 B2 * | 1/2005 | Kroeger et al. | 342/70 |
| 6,853,329 B2 * | 2/2005 | Shinoda et al. | 342/149 |
| 6,933,881 B2 * | 8/2005 | Shinoda et al. | 342/70 |
| 6,972,711 B2 * | 12/2005 | Shono | 342/92 |
| 7,071,868 B2 * | 7/2006 | Woodington et al. | 342/70 |
| 7,081,847 B2 * | 7/2006 | Ziller et al. | 342/70 |
| 7,132,976 B2 * | 11/2006 | Shinoda et al. | 342/70 |
| 7,268,722 B2 * | 9/2007 | Gottwald et al. | 342/70 |
| 7,275,431 B2 * | 10/2007 | Zimmermann et al. | 73/510 |
| 7,463,185 B2 * | 12/2008 | Nakanishi | 342/70 |
| 7,504,988 B2 * | 3/2009 | Tsuchihashi et al. | 342/70 |
| 7,518,545 B2 * | 4/2009 | Minichshofer | 342/70 |
| 7,592,945 B2 * | 9/2009 | Colburn et al. | 342/70 |
| 7,675,457 B2 * | 3/2010 | Nakanishi | 342/133 |
| 7,764,223 B2 * | 7/2010 | Wade | 342/107 |
| 7,773,028 B2 * | 8/2010 | Chan et al. | 342/137 |
| 7,786,928 B2 * | 8/2010 | Hansen et al. | 342/175 |
| 7,791,530 B2 * | 9/2010 | Puglia | 342/128 |
| 7,821,443 B2 * | 10/2010 | Winkler et al. | 342/70 |
| 8,009,082 B2 * | 8/2011 | Shinoda et al. | 342/70 |
| 8,405,541 B2 * | 3/2013 | Lee et al. | 342/118 |
| 8,582,085 B2 * | 11/2013 | Sebastian et al. | 356/4.09 |
| 8,624,776 B2 * | 1/2014 | Jales et al. | 342/134 |
| 2003/0164791 A1 * | 9/2003 | Shinoda et al. | 342/70 |
| 2005/0156780 A1 * | 7/2005 | Bonthron et al. | 342/107 |
| 2005/0179582 A1 * | 8/2005 | Woodington et al. | 342/70 |
| 2006/0262007 A1 * | 11/2006 | Bonthron et al. | 342/70 |
| 2007/0205938 A1 * | 9/2007 | Zimmermann et al. | 342/69 |
| 2008/0018526 A1 * | 1/2008 | Wade | 342/204 |
| 2008/0100500 A1 * | 5/2008 | Kondoh | 342/109 |
| 2008/0165049 A1 * | 7/2008 | Wakayama et al. | 342/91 |
| 2008/0258964 A1 * | 10/2008 | Schoeberl et al. | 342/189 |
| 2008/0278370 A1 * | 11/2008 | Lachner et al. | 342/200 |
| 2009/0201194 A1 * | 8/2009 | Winkler et al. | 342/146 |
| 2009/0267822 A1 * | 10/2009 | Shinoda et al. | 342/70 |
| 2011/0267217 A1 * | 11/2011 | Hildebrandt et al. | 342/70 |

OTHER PUBLICATIONS

Yi-An Li et al., "A Fully Integrated 77GHz FMCW Radar System in 65nm CMOS", 2010 IEEE International Solid-Sate Circuits Conference (ISSCC 2010), Session 11, Feb. 9, 2010, 9:00 AM, pp. 216-218.

H. P. Forstner et al., "A 77GHz 4-Channel Automotive Radar Transceiver in SiGe", 2008 IEEE Radio Frequency Integrated Circuits Symposium, pp. 233-236, Apr. 17, 2008.

* cited by examiner

RADAR APPARATUS SUPPORTING SHORT AND LONG RANGE RADAR OPERATION

CROSS-REFERENCES TO RELATED APPLICATIONS

The present application claims priority under 35 U.S.C 119(a) to Korean Application No. 10-2011-0023592 filed on Mar. 16, 2011 and Korean Application No. 10-2012-0023430 filed on Mar. 7, 2012 in the Korean Intellectual Property Office, which is incorporated herein by reference in its entirety as set forth in full.

BACKGROUND

Exemplary embodiments of the present invention relate to a radar apparatus, and more particularly, to a radar apparatus supporting short and long range radar operations capable of implementing miniaturization, high integration, and low power consumption by implementing most components in the radar apparatus on a single chip while supporting a short range radar operation and a long range radar operation by a single apparatus or system configuration.

A background art of the present invention is disclosed in Korean Patent Laid-Open Publication No. 2009-0067990 (Published in Jun. 25, 2009).

Recently, as a demand for a short range high resolution radar in a millimeter/sub-millimeter band is increased, a study therefor has been continued. The high resolution radar system capable of discriminating or decomposing a distance between proximity objects has been variously used as industrial, military applications, and the like, and has been mainly used for a radar system for a vehicle in a real life. The radar system for a vehicle, which is an essential technology for implementing an intelligent traffic system, may mean a safety driving system of a vehicle developed so as to previously prevent accidents occurring due to poor weather conditions or carelessness of a driver by sensing motions of other vehicles or objects that move or stop within a radius of about 250 m or less.

The high resolution radar system in accordance with the related art detects objects in all directions by scanning objects with a precise mechanical apparatus so as to obtain the high spatial resolution within a small field of view. However, when the number of antennas is increased so as to increase the spatial resolution, a size of the mechanical apparatus is large. Therefore, a multi-beam antenna and a digital beamforming technology that can implement electrical scanning have been used, which are mainly applied to, in particular, a small radar for a vehicle.

The radar technology for a vehicle may be classified into a long range radar (LRR) capable of being sensed up to about 250 m or less and a short range radar (SRR) capable of being sensed up to about 60 m or less. In the case of the LRR, a frequency of a 77 GHz band has been mainly used and in the case of the SRR, a frequency of a 24 GHz band has been mainly used. The radar apparatus for a vehicle in accordance with the related art has a limitation in simultaneously applying an LRR mode having a relatively long detection range and a narrow field of view according to each application and an SRR mode having a short detection range or a wide field of view to a single apparatus or system.

FIG. 1 illustrates an example of a configuration of a radar apparatus in accordance with the related art; The radar apparatus in accordance with the related art illustrated in FIG. 1 adopts a structure in which a transmitter 103 can perform beamforming and time division and a receiver 107 can receive nine channel data to reduce the number of antennas 104 and 105, thereby implementing miniaturization. However, the radar apparatus in accordance with the related art illustrated in FIG. 1 may perform only one of the long range radar operation or the short range radar operation and thus, cannot simultaneously implement the long and short range radar modes.

Further, the radar apparatus in accordance with the related art of FIG. 1 adopts a structure of using a switch to sequentially receive signal from an array antenna. However, the switch needs to have excellent isolation characteristics. These characteristics can be implemented only by a compound element. The current CMOS technology is hard to implement the excellent isolation characteristics, such that there is a limitation in implementing the transmitting and receiving radar apparatus in a single chip type by using the CMOS technology. To the present, the radar of the long range and short range applications for a vehicle has been commercialized. However, the radar is expensive, consumes large power, and has a large volume, which leads to a limitation in being simultaneously mounted in the front, rear, and sides of all the vehicles. Recently, an SiGe technology has been used to implement miniaturization through integration, but makes it more difficult to implement low power consumption than the CMOS technology and has a limitation in implementing miniaturization or low price due to a large antenna.

SUMMARY

An embodiment of the present invention is directed to a radar apparatus supporting short and long range radar operations capable of implementing miniaturization, high integration, and low power consumption by implementing most components in the radar apparatus on a single chip while supporting a short range radar operation and a long range radar operation by a single apparatus or system configuration.

A radar apparatus supporting long range and short range radar operations is provided, wherein a plurality of short range transmitting chirp signals and a plurality of long range transmitting chirp signals are generated by a predetermined modulation scheme and is transmitted to an object through at least one transmitting array antenna and signals reflected from the object is received through at least one receiving array antenna, and the plurality of long range transmitting chirp signals have transmission power larger than that for the plurality of short range transmitting chirp signals.

At the time of sensing the long range a longer detection range and a narrower detection angle are obtained and better resolution for the detection angle is obtained than at the time of sensing the short range, and at the time of sensing the short range a shorter detection range and a wider detection angle are obtained and better resolution for the detection range is obtained than at the time of sensing the long range.

The predetermined modulation scheme may adopt at least one frequency modulated continuous-wave (FMCW) modulation scheme for detecting multi targets.

The plurality of long range transmitting chirp signals and the plurality of short range transmitting chirp signals may include a plurality of chirp signals having different slopes of frequency with respect to time, respectively, for detecting multi targets.

The plurality of long range transmitting chirp signals may include at least six chirp signals having different slopes of frequency with respect to time and the plurality of long range transmitting chirp signals may include at least four chirp signals having different slopes of frequency with respect to time.

The radar apparatus may include: an antenna unit configured to include the at least one transmitting array antenna and the at least one receiving array antenna; a transmitter configured to generate the plurality of long range transmitting chirp signals and the plurality of short range transmitting chirp signals and transmit the generated chirp signals through the at least one transmitting array antenna; a receiver configured to process the reflected signal received through the at least one receiving array antenna; and a signal processing processor configured to generate control signals for generating the plurality of short range transmitting chirp signals and the plurality of long term transmitting chirp signals and process the signals processed through the receiver.

The transmitter may include at least two power amplifiers configured to differently output the transmission power for the plurality of long range transmitting chirp signals and the transmission power for the plurality of short range transmitting chirp signals.

The power amplifier may vary the transmitting power into two-stage or more according to an operating mode for easily controlling the detection range.

The transmitter may include: a frequency synthesizer configured to synthesize a frequency based on the control signals; an oscillator configured to receive an output of the frequency synthesizer to generate a carrier signal; a frequency multiplier configured to perform frequency multiplication on the output signal of the oscillator; a driver configured to drive an signal of the frequency multiplier; and at least two power amplifier configured to amplify the output signal of the driver to differently output the transmission power for the plurality of short range transmitting chirp signals and the transmission power for the plurality of long range transmitting chirp signals.

The at least two power amplifiers may be a variable gain amplifier.

The receiver may include a plurality of receiving units, wherein each receiving unit includes: a low noise amplifier configured to amplify the received reflected wave signal; a down converting mixer configured to remove carrier component from an output of the low noise amplifier; and a filter configured to remove noise from an output of the down converting mixer.

The transmitter and the receiver may be implemented on a single chip by a CMOS technology.

The transmitter and the receiver, and the signal processing processor may be implemented on three chips of a transmitting chip, a receiving chip, and a signal processing unit chip, two chips of a transmitting and receiving chip and a signal processing unit chip, or a single chip on which the transmitting and receiving chip and the signal processing unit chip are integrated by the CMOS technology.

The at least one transmitting and receiving array antennas may be fabricated on a low temperature co-fired ceramics (LTCC) substrate so as to be miniaturized.

The at least one receiving array antenna may be a plurality of phase array antennas that detect an azimuth angle of the object.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Figure 1:
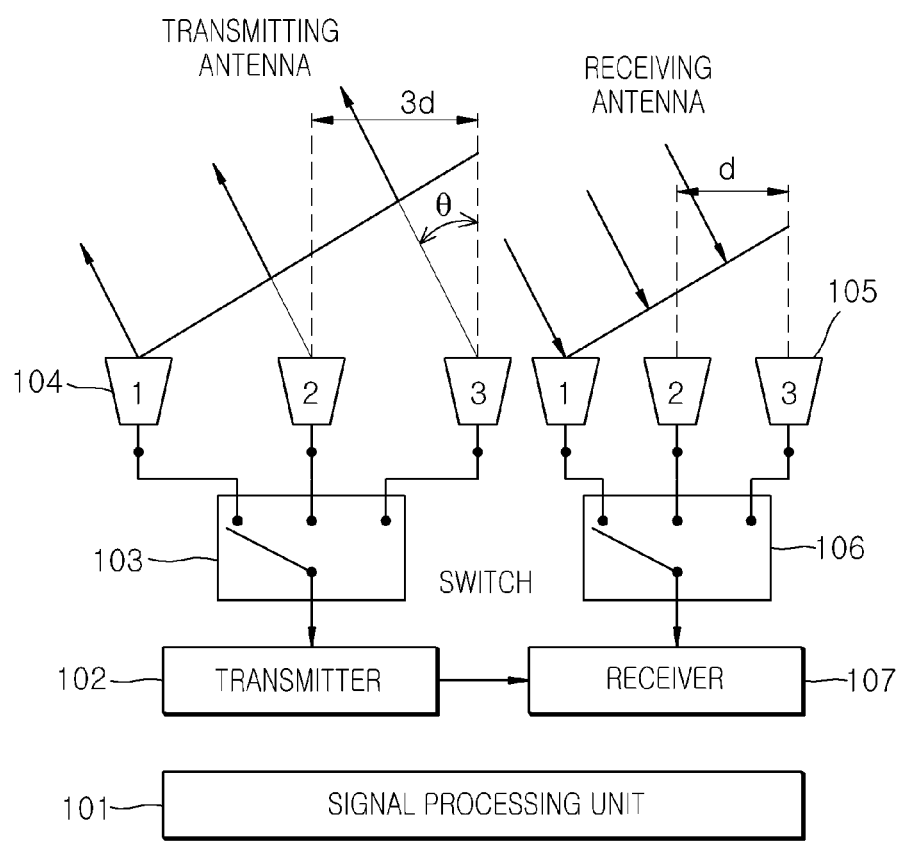
FIG. 1 illustrates an example of a configuration of a radar apparatus in accordance with the related art.

Hereinafter, an apparatus and a method for inputting information based on events in accordance with an embodiment of the present invention will be described with reference to the accompanying drawings. In describing the embodiment, a thickness of lines illustrated in the drawings, a size of components, etc., may be exaggeratedly illustrated for clearness and convenience of explanation. In addition, terms described to be below are terms defined in consideration of operations in the present invention, which may be changed according to the intention or practice of a user or an operator. Therefore, these terms will be defined based on contents throughout the specification.

Figure 2:
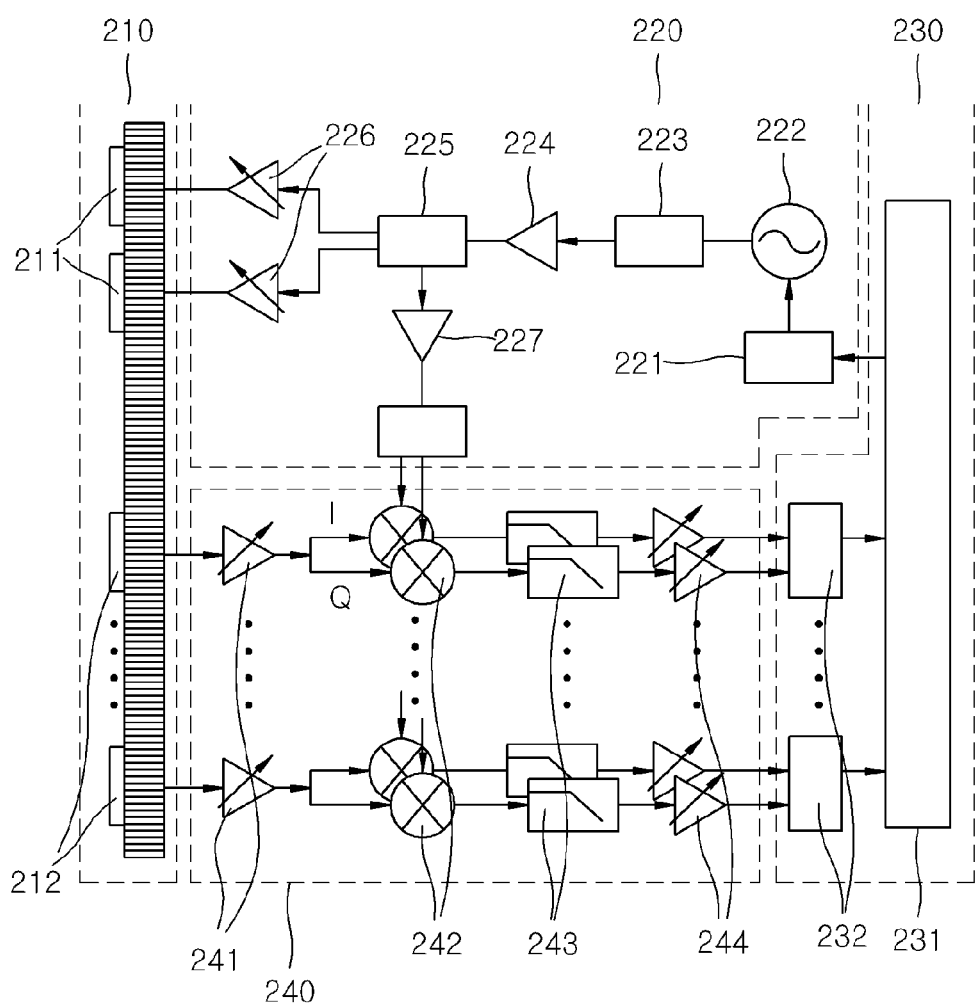
FIG. 2 is a diagram illustrating a configuration of a radar apparatus simultaneously supporting short range and long range radar operations in accordance with the embodiment of the present invention.
Figure 3:
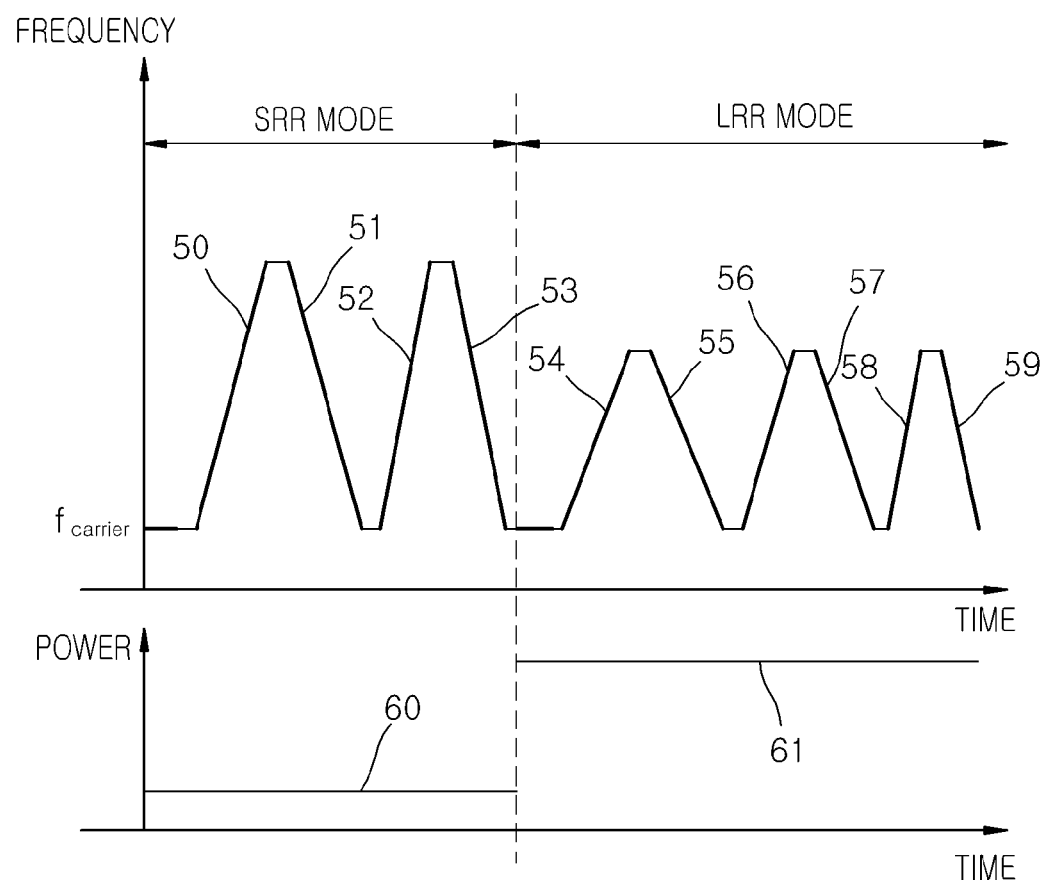
FIG. 3 is a diagram illustrating a plurality of short range transmitting chirp signals and a plurality of long range transmitting chirp signals that are transmitted from a radar apparatus in accordance with the embodiment of the present invention.
Figure 4:
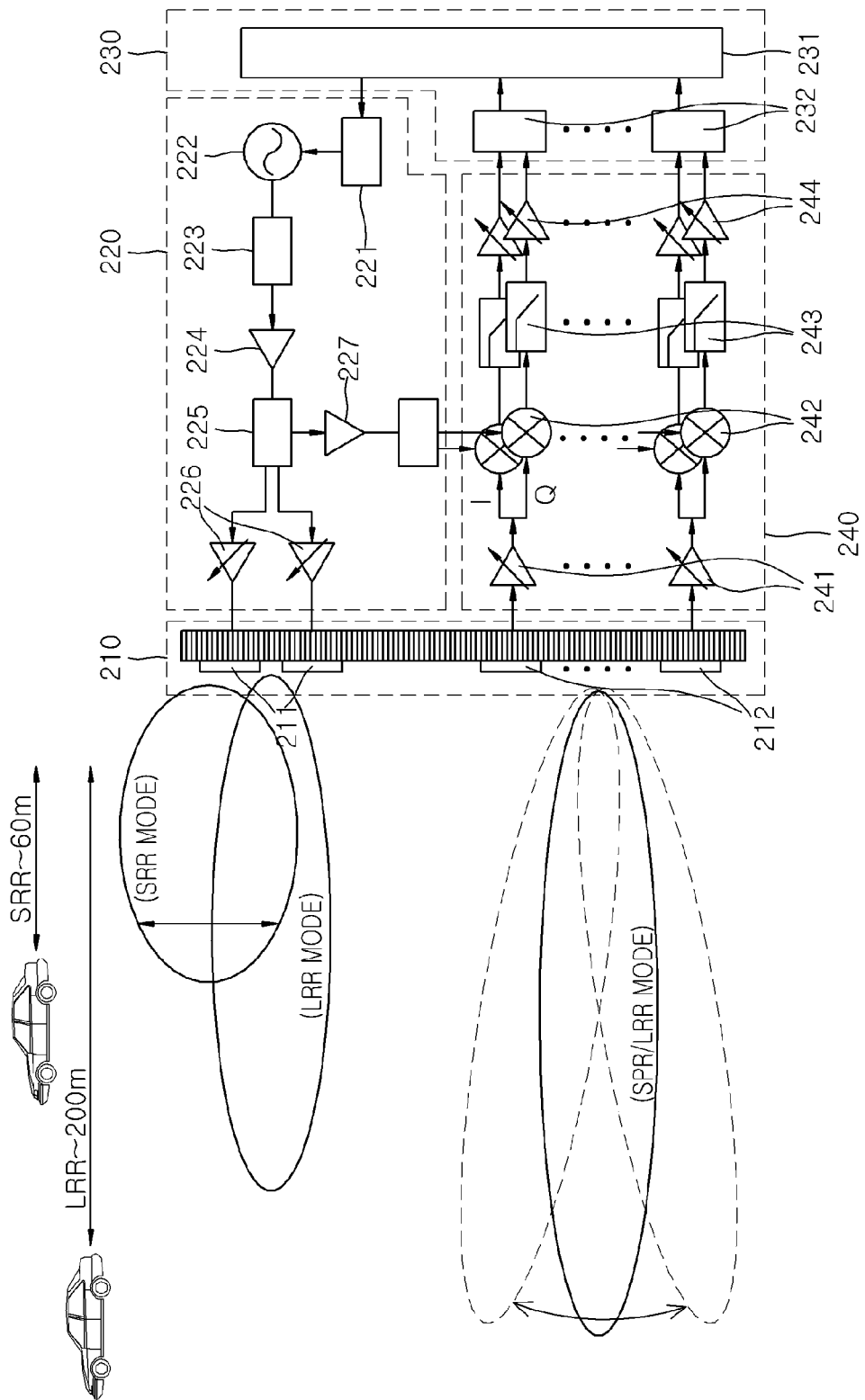
FIG. 4 is a conceptual diagram for describing signals radiated and reflected and received from the radar apparatus in accordance with the embodiment of the present invention.

FIG. 2 is a diagram illustrating a configuration of a radar apparatus simultaneously supporting short range and long range radar operations in accordance with the embodiment of the present invention, FIG. 3 is a diagram illustrating a plurality of short range transmitting chirp signals and a plurality of long range transmitting chirp signals that are transmitted from a radar apparatus in accordance with the embodiment of the present invention, and FIG. 4 is a conceptual diagram for describing signals radiated and reflected and received from the radar apparatus in accordance with the embodiment of the present invention.

As illustrated in FIG. 2, a radar apparatus simultaneously supporting short range and long range radar operations in accordance with an embodiment of the present invention generates a plurality of short range transmitting chirp signals and a plurality of long range transmitting chirp signals by a frequency modulated continuous-wave (FMCW) modulation scheme and transmits the generated chirp signals to an object (not illustrated) through at least one transmitting array antenna 211 and receives a signal reflected from an object through at least one receiving array antenna 212, wherein the plurality of long range transmitting chirp signal has transmit power larger than that of the plurality of short range transmitting chirp signals.

The radar apparatus may be configured to include: an antenna unit 210 including the at least one transmitting array antenna 211 and the at least one receiving array antenna 212; a transmitter 220 generating the plurality of short range transmission chirp signals and the plurality of long range transmitting chirp signals by the FMCW modulation scheme and transmitting the generated chirp signals through the at least one transmitting array antenna 211; a receiver 240 processing a reflected wave signal received through the at least one receiving array antenna 212; and a signal processing processor 231 generating a control signal for generating the plurality of short range transmitting chirp signals and the plurality of long range transmitting chirp signals and processing the signals processed by the receiver 240.

The transmitter 220 is configured to include: a frequency synthesizer synthesizing a frequency based on the control signal; an oscillator 222 receiving an output of the frequency synthesizer 221 and generating a carrier signal; a frequency multiplier 223 performing frequency multiplication on an output signal of the oscillator 222; a driver 225 driving an signal of the frequency multiplier 223; and at least two power amplifiers 226 amplifying an output signal of the driver 225 and outputting different transmission power for the plurality of short range transmitting chirp signals and the plurality of long range transmitting chirp signals.

The power amplifiers 226 may be designed such that the transmitting power can be varied into two-stage or more in order to easily control the detection range on the long range mode and the short range mode.

The receiver 240 includes a plurality of receiving units, wherein each receiving unit includes a low noise amplifier 241 amplifying the received reflected wave signal; a down converting mixer 242 removing carrier components from the output of the low noise amplifier 241; and a filter 243 removing noise from the output of the down converting mixer 242.

Operation and action of the embodiment of the present invention configured as described above will be described in detail with reference to FIGS. 2 to 4.

In order for a single apparatus or system to simultaneously use a long range radar (LRR) operation and a short range radar (SRR) operation, the radar apparatus in accordance with the embodiment of the present invention has the following configuration. That is, the radar apparatus in accordance with the embodiment of the present invention include a structural feature such as i) a new frequency modulated continuous-wave (FMCW) modulation scheme, ii) a control of transmission power for controlling a detection range, and iii) a combination of an antenna for controlling a field of view and a power amplifier, and the like.

First, the radar apparatus in accordance with the embodiment of the present invention generates the plurality of short range transmitting chirp signals and the plurality of long range transmitting chirp signals by the FMCW modulation scheme and transmits the generated chirp signals to an object (not illustrated) through at least one transmitting array antenna 211. Describing this in detail, the signal processing processor 231 included in the signal processing unit 230 first generates control signals for generating the plurality of short range transmitting chirp signals and the plurality of long range transmitting chirp signals and transmits the generated control signals to the transmitter 220. In the embodiment of the present invention, as the modulation scheme, the at least one frequency modulated continuous-wave (FMCW) modulation scheme may be adopted for detecting the multi targets.

Then, the frequency synthesizer 221 of the transmitter 220 synthesizes and outputs the frequency based on the control signal. In the exemplary embodiment of the present invention, the frequency synthesizer 221 may use, for example, a direct digital frequency synthesizer (DDFS). Then, the oscillator 222 receives the output of the frequency synthesizer 221 to generate the carrier signals, wherein as the oscillator 222, a voltage controlled oscillator (VCO) may be used. Next, the frequency multiplier 223 multiplies and outputs the output signal of the oscillator 222. The frequency multiplier 223 is an element outputting a frequency that is an integer time of the input frequency. The frequency multiplier 223 in accordance with the embodiment of the present invention may in particular multiply and output the frequency twice.

Next, a drive amplifier 224 amplifies and outputs the output signal of the frequency multiplier 223. The driver 225 provides the output signal of the frequency multiplier 223 to a driving power amplifier 226 and also provides the output signal to the driver amplifier 227. Further, the power amplifier 226 amplifies the output signal of the driver 225 and outputs the transmitting array antenna 211 of the antenna unit 210. In this case, at least two power amplifiers 226 may be applied as illustrated in FIG. 2. In particular, the two power amplifiers (226) each has different amplification factor, which is to make the transmission power for the short range chirp signal and the long range transmitting chirp signal different as described below. Further, as illustrated in FIG. 2, the power amplifier 226 may be a variable gain amplifier that can vary and control the amplification factor.

As a result, as illustrated in FIG. 3, the plurality of short range transmitting chirp signals and the plurality of long range transmitting chirp signals are generated by the transmitter 220 via the processes. As illustrated in FIG. 3, the plurality of chirp signals for the short range radar (SRR) operation include four chirp signals 50, 51, 52, and 53 having different slopes of frequency with respect to time and the transmission power 60 for the short range transmission has relatively lower and mainly targets objects that are positioned within the a range of about 60 m or less. Further, as illustrated in FIG. 3, the plurality of chirp signals for the long range radar (SRR) operation include six chirp signals 54, 55, 56, 57, 58, and 59 having different slopes of frequency with respect to time and the transmission power 61 for the long range transmission has relatively higher than that for the short range transmitting chirp signal and mainly targets objects that are positioned within a distance of the range of about 150 m or less. As described above, when four chirp signals for short range having different slopes and six chirp signals for long range having different slopes are generated and radiated, about 32 objects can be detected. In order to further increase the number of objects, it is sufficient to further increase the number of chirp signals. In addition, the short range transmitting chirp signal is amplified by the amplifier having the relatively lower amplification factor among the two power amplifiers 226 as illustrated in FIG. 2 and the long range transmitting chirp signal is amplified by the amplifier having the relatively higher amplification factor among the two power amplifiers 226, such that they may have the transmission output as illustrated in FIG. 3.

Next, the generated plurality of short range transmitting chirp signals and plurality of long range transmitting chirp signals are radiated to objects through the transmitting array antenna 211. The short range transmitting chirp signals needs to be radiated to have the wider field of view with respect to the relatively shorter distance range and the long range transmitting chirp signals needs to be radiated to have the narrower field of view with respect to the relatively longer distance range. To this end, one of the transmitting array antennas 211 may be designed to widen the field of view of the antenna that means the detectable angle range and the other one thereof may be designed to narrow the field of view of the antenna. In addition, in accordance with the embodiment, the field of view may also be controlled by controlling the number of turned-on antennas among the transmitting array antennas 211. FIG. 4 is a conceptual diagram for describing signals radiated and reflected and received from the radar apparatus in accordance with the embodiment of the present invention. As illustrated in FIG. 4, the short range transmitting chirp signals are radiated to have the wide field of view with respect to the relatively shorter distance range and the long range transmitting chirp signals are radiated to have the narrow field of view with respect to the relatively longer distance range and then, received through the receiving array antenna 212.

As described above, the embodiment of the present invention generates the transmitting signal using the FMCW modulation scheme but generates the plurality of short range transmitting chirp signals and the plurality of long range transmitting chirp signals having different slopes of frequency with respect to time and makes the transmission power for the long range transmitting chirp signals larger than that for the short range transmitting chirp signals, such that the single radar apparatus can implement both of the short range radar operation and the long range radar operation. The radar apparatus according to the embodiment of the present invention may have a long detection range and a narrow detection angle and have good resolution for the detection angle at the time of sensing the long range and have a short detection range and a wide detection angle and have excellent resolution for the detection range.

Meanwhile, the transmitted chirp signals are reflected by an object and the plurality of receiving array antennas 212 receive signals reflected from an object. In the embodiment of the present invention, the receiving array antenna 212 includes at least eight antenna elements and the plurality of receiving units connected thereto as illustrated in FIG. 2. The receiving antenna in accordance with the embodiment of the present invention is a phase array antenna, which can detect an azimuth angle of the object. Each receiving unit may include a low noise amplifier 241, a down converting mixer 242, a filter 243, and a variable gain amplifier 244 that are connected to the antenna elements, respectively. Hereinafter, an operation will be described in a unit of each receiving unit.

The low noise amplifier 241 amplifies and outputs the reflected wave signal received by the receiving array antenna 212. As the low noise amplifier 241, a variable gain I/Q low noise amplifier may be applied. Next, the down converting mixer 242 removes and outputs the carrier component from the output signal of the low noise amplifier 241.

Next, the filter 243 removes and outputs noise from the output signal of the down converting mixer 242 and the variable gain amplifier (VGA) 244 amplifies the output signal and outputs the amplified output signal to the signal processing unit 230. Further, an analog-digital converter (ADC) 232 of the signal processing unit 230 converts the provided signals from an analog form into a digital form and provides the converted signals to the signal processing processor 231.

The signal processing processor 231 receives signals from the receiving array antenna 212 that is the phase array antenna and receives the signals provided via the plurality of receiving units of the receiver 240 and performs the signal processing thereon, thereby performing a work such as a location detection (an azimuth angle detection of an object), and the like.

Meanwhile, the transmitting and receiving array antennas in accordance with the embodiment of the present invention may be manufactured on a low temperature co-fired ceramics (LTCC) substrate, which can be configured as the small and slim apparatus.

As described above, the embodiment of the present invention generates the plurality of short range transmitting chirp signals and the plurality of long range transmitting chirp signals having different slopes of frequency with respect to time and makes the transmission power for the long range transmitting chirp signals larger than that for the short range transmitting chirp signals, such that the single radar apparatus can implement both of the short range radar operation and the long range radar operation. Further, as describe above, the embodiment of the present invention differently sets the amplification factors of the plurality of power amplifiers 226 so as to perform the long range radar operation and the short range radar operation and thus, does not use a separate switch device. Therefore, the embodiment of the present invention can implement the transmitter 220, the receiver 240, and the signal processing unit 230 including the signal processing processor 231 within the radar apparatus on the single chip by the CMOS technology. Therefore, the radar apparatus in accordance with the embodiment of the present invention can achieve miniaturization, high integration, and low power consumption by implementing most components in the radar apparatus on the single chip while supporting the short range radar operation and a long range radar operation. In particular, the transmitter and the receiver, and the signal processing processor may be implemented on three chips of a transmitting chip, a receiving chip, and a signal processing unit chip, two chips of a transmitting and receiving chip and a signal processing unit chip, or a single chip on which the transmitting and receiving chip and the signal processing unit chip are integrated Further, the transmitting and receiving array antenna in accordance with the embodiment of the present invention is manufactured on the LTCC substrate and then, is applied with a flip chip package technology, which can be implemented as the small and slim apparatus.

The radar apparatus in accordance with the embodiments of the present invention can achieve miniaturization, high integration, and low power consumption by implementing most components in the radar apparatus on the single chip while supporting the short range radar operation and a long range radar operation by the single apparatus or system configuration.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A radar apparatus supporting long range and short range radar operations, comprising:
   a signal processing unit configured to generate control signals for generating chirp signals used for a transceiving mode selected from the group consisting of a Short Range Radar (SRR) mode and a Long Range Radar (LRR) mode;
   a transmitter configured to generate the chirp signals used for the transceiving mode based on the control signals received from the signal processing unit and a predetermined modulation scheme; and
   a plurality of transmitting array antennas configured to transmit the generated chirp signals,
   wherein the transmitter comprises a plurality of power amplifiers being connected to the plurality of transmitting array antennas, respectively, and configured to differently amplify transmission power of the chirp signals according to the transceiving mode.

2. The radar apparatus of claim 1, wherein the chirp signals used for the SRR mode have a shorter detection range and a wider detection angle than chirp signals used for the LRR mode.

3. The radar apparatus of claim 1, wherein the predetermined modulation scheme is a frequency modulated continuous-wave (FMCW) modulation scheme.

4. The radar apparatus of claim 1, wherein the chirp signals having chirp signals used for the SRR mode and the chirp signals used for the LRR mode have different slopes of frequency with respect to time.

5. The radar apparatus of claim 4, wherein the transmitter generates 6 or more chirp signals having different slopes of frequency with respect to time in the LRR mode, and
   generates 4 or more chirp signals having different slopes of frequency with respect to time in the SRR mode.

6. The radar apparatus of claim 1, wherein the transmitter comprises:
a frequency synthesizer configured to synthesize a frequency based on the control signals;
an oscillator configured to receive an output of the frequency synthesizer to generate a carrier signal;
a frequency multiplier configured to perform frequency multiplication of the output signal of the oscillator;
a driver configured to drive a signal of the frequency multiplier; and
the plurality of power amplifiers configured to amplify the output signal of the driver.

7. The radar apparatus of claim 1, wherein the plurality of power amplifiers are variable gain amplifiers.

8. The radar apparatus of claim 7, wherein the power amplifiers vary a transmitting power into two-stage or more according to the transceiving mode.

9. The radar apparatus of claim 1, further comprising:
a plurality of receiving array antennas configured to receive reflected wave signals outputted by the plurality of transmitting array antennas and reflected by an object; and
a receiver configured to process the received reflected wave signals,
wherein the signal processing unit is configured to signal-process the processed reflected wave signals.

10. The radar apparatus of claim 9, wherein the receiver comprises a plurality of receiving units, and each of the receiving units includes:
a low noise amplifier configured to amplify the received reflected wave signal;
a down converting mixer configured to remove carrier component from an output of the low noise amplifier; and
a filter configured to remove noise from an output of the down converting mixer.

11. The radar apparatus of claim 9, wherein the transmitter and the receiver are implemented in a single chip by a CMOS technology.

12. The radar apparatus of claim 9, wherein the transmitter, the receiver and the signal processing unit are embodied by a CMOS technology and are implemented in a transmitting chip, a receiving chip and a signal processing unit chip, or implemented in a transceiving chip and a signal processing unit chip, or implemented in a single chip in which a transceiving chip and a signal processing unit chip are integrated.

13. The radar apparatus of claim 9, wherein the plurality of transmitting array antennas and receiving array antennas are fabricated on a low temperature co-fired ceramics (LTCC) substrate.

14. The radar apparatus of claim 9, wherein the plurality of receiving array antenna are a plurality of phase array antennas capable of detecting an azimuth angle of the object.

* * * * *